United States Patent [19]

Wingler et al.

[11] Patent Number: 4,621,117

[45] Date of Patent: Nov. 4, 1986

[54] ACRYLONITRILE-FREE POLYCARBONATE BLENDS

[75] Inventors: Frank Wingler, Leverkusen; Otto Koch; Christian Lindner, Cologne; Klaus Reinking, Wermelskirchen, all of Fed. Rep. of Germany

[73] Assignee: Bayer Aktiengesellschaft, Leverkusen, Fed. Rep. of Germany

[21] Appl. No.: 830,177

[22] Filed: Feb. 18, 1986

Related U.S. Application Data

[63] Continuation of Ser. No. 763,513, Aug. 8, 1985, abandoned.

[30] Foreign Application Priority Data

Aug. 21, 1984 [DE] Fed. Rep. of Germany ....... 3430688

[51] Int. Cl.[4] ............................................. C08L 69/00
[52] U.S. Cl. .................................... 525/67; 525/68; 525/146; 525/148; 525/902
[58] Field of Search ................ 525/67, 146, 148, 68, 525/467, 468, 902

[56] References Cited

U.S. PATENT DOCUMENTS

| | | | |
|---|---|---|---|
| 4,197,376 | 4/1980 | Lee et al. | 525/74 |
| 4,218,544 | 8/1980 | Henton | 525/67 |
| 4,351,920 | 9/1982 | Ariga et al. | 525/67 |
| 4,404,322 | 9/1983 | Saito et al. | 525/74 |
| 4,493,920 | 1/1985 | Le Khac | 525/67 |
| 4,569,969 | 2/1986 | Jones et al. | 525/67 |

FOREIGN PATENT DOCUMENTS

0135492  3/1985  European Pat. Off. .

*Primary Examiner*—Theodore E. Pertilla
*Attorney, Agent, or Firm*—Connolly and Hutz

[57] ABSTRACT

This invention relates to thermoplastic moulding compounds which are free from nitrile groups, obtained from randomly structured aromatic vinyl copolymers containing N-phenyl- or methyl-maleimide, aromatic polycarbonate resins and an elastomer grafted with methyl methacrylate.

1 Claim, No Drawings

ACRYLONITRILE-FREE POLYCARBONATE BLENDS

This is a continuation of application Ser. No. 763,513 filed Aug. 8, 1985, now abandoned.

This invention relates to thermoplastic moulding compounds free from nitrile groups, obtained from randomly structured aromatic vinyl copolymers containing N-phenyl- or methyl-maleimide, aromatic polycarbonate resins and an elastomer which is grafted with methyl methacrylate.

Polymer mixtures based on styrene/maleic acid anhydride/acrylonitrile copolymers, polycarbonate resins and rubber graft polymers containing acrylonitrile groups are described in DE-OS No. 2 653 146 and DE-OS No. 2 653 143.

DE-OS No. 3 130 774 discloses mixtures containing styrene/maleic acid anhydride or styrene/maleic acid anhydride/acrylonitrile resins, polycarbonate resins and graft products of styrene or styrene and acrylontrile on a rubber.

It has been found, however, that such polymer mixtures containing acrylonitrile readily discolour when processed and tend to undergo cross-linking, especially when used in combination with maleic acid anhydride copolymers. Moreover, graft products containing mainly styrene or also acrylonitrile are not compatible with the maleic acid anhydride or maleimide resin component, with the result that delamination occurs when the products are subjected to mechanical stress. It has therefore been attempted to graft rubbers with anhydride polymers and mix these graft products with a polycarbonate resin, another anhydride copolymer of a monovinylidene aromatic monomer and an $\alpha,\beta$-ethylenically unsaturated anhydride as well as with a compatible polymer of a monomer other than the anhydride (U.S. Pat. No. 4,218,544). Other rubber-modified styrene/maleic acid anhydride copolymers prepared by the polymerisation of styrene and maleic acid anhydride in the presence of a rubber in admixture with a polycarbonate resin as the main component are mentioned in EP-A No. 63 634 and U.S. Pat. No. 4,351,920. Delamination also occurs in these mixtures. Moreover, due to the tendency to alternating 1:1 copolymerisation with aromatic vinyl compounds, the random incorporation of maleic acid anhydride in graft products can only be achieved by keeping to special inlet and after-dosing conditions which in any case are not sufficiently reproducible; see also U.S. Pat. No. 3,919,854.

The object of the invention are thermoplastic moulding compounds obtained from (A) 20–78 parts by weight (based on the moulding compound) of a random copolymer of
  ($a_1$) 12 to 92 parts by weight (based on the copolymer) of styrene, p-methylstyrene or mixtures thereof,
  ($a_2$) 8 to 30 parts by weight (based on the copolymer) of a mixture of 100 to 10% by weight of N-phenyl- or N-methylmaleimide and 0 to 90% by weight of maleic acid anhydride,
  ($a_3$) 0 to 80 parts by weight (based on the copolymer) of methyl methacrylate,
(B) 12–60 parts by weight (based on the moulding compound) of a thermoplastic dihydroxydiarylalkane polycarbonate and
(C) 10–40 parts by weight (based on the moulding compound) of a graft polymer of 20 to 80 parts by weight of methyl methacrylate on 80 to 20 parts by weight of a rubber having a glass transition temperature below $-20°$ C.

The resins (A) are randomly structured. Such randomly structured copolymers may advantageously be prepared by a continuous mass or solution polymerisation of the corresponding monomers with incomplete conversion.

Preferred copolymers A are obtained from 70 to 92 parts by weight of styrene, 8 to 30 parts by weight of N-phenyl- or N-cyclohexyl-maleimide; 70 to 92 parts by weight of styrene, 6 to 28 parts by weight of N-phenyl- or N-cyclohexyl-maleimide and 2 to 24 parts by weight of maleic acid anhydride; 12 to 87 parts by weight of styrene, 8 to 30 parts by weight of N-phenyl- or N-cyclohexyl-maleimide, 5 to 80 parts by weight of methylmethacrylate; 12 to 87 parts by weight of styrene, 6 to 28 parts by weight of N-phenyl- or N-cyclohexyl-maleimide, 2 to 24 parts by weight of maleic acid anhydride and 5 to 60 parts by weight of methylmethacrylate.

The polymers may contain p-methylstyrene instead of styrene.

(B) Aromatic dihydroxy-diarylalkane polycarbonates based, for example, on
  dihydroxybiphenyls,
  bis-(hydroxyphenyl)-alkanes,
  bis-(hydroxyphenyl)-cycloalkanes,
  bis-(hydroxyphenyl)-sulphides,
  bis-(hydroxyphenyl)-ethers,
  bis-(hydroxyphenyl)-ketones,
  bis-(hydroxyphenyl)-sulphoxides,
  bis-(hydroxyphenyl)-sulphones or
  $\alpha,\alpha'$-bis-(hydroxyphenyl)-diisopropylbenzenes, or the corresponding compounds alkylated or halogenated in the nucleus may be used for the preparation of the polymer blends. These and other suitable diphenols are described, for example, in U.S. Pat. Nos. 3,028,365; 2,999,835; 3,148,172; 3,275,601; 2,991,273; 3,271,367; 3,062,781 and 2,999,846; in German Offenlegungsschriften Nos. 1 570 703; 2 063 050; 2 063 052; 2 211 956 and 2 211 957; in French Patent No. 1 561 518 and in the monograph, "H.Schnell, Chemistry and Physics of Polycarbonates, Interscience Publishers, New York, 1964". The following are examples of preferred diphenols:

4,4'-Dihydroxy-biphenyl;
2,2-bis-(4-hydroxyphenyl)-propane;
2,4-bis-(4-hydroxyphenyl)-2-methylbutane;
1,1-bis-(4-hydroxyphenyl)-cyclohexane;
$\alpha,\alpha'$-bis-(4-hydroxyphenyl)-p-diisopropylbenzene;
2,2-bis-(3-methyl-4-hydroxyphenyl)-propane;
2,2-bis-(3-chloro-4-hydroxyphenyl)-propane;
bis-(3,5-dimethyl-4-hydroxyphenyl)-methane;
2,2-bis-(3,5-dimethyl-4-hydroxyphenyl)-propane;
bis-(3,5-dimethyl-4-hydroxyphenyl)-sulphone;
2,4-bis-(3,5-dimethyl-4-hydroxyphenyl)-2-methylbutane;
1,1-bis-(3,5-dimethyl-4-hydroxyphenyl)-cyclohexane;
$\alpha,\alpha'$-bis-(3,5-dimethyl-4-hydroxyphenyl)-p-diisopropylbenzene;
2,2-bis-(3,5-dichloro-4-hydroxyphenyl)-propane, and
2,2-bis-(3,5-dibromo-4-hydroxyphenyl)-propane.

The following are examples of particularly preferred diphenols:
2,2-Bis-(4-hydroxyphenyl)-propane;
2,2-bis-(3,5-dimethyl-4-hydroxyphenyl)-propane;
2,2-bis-(3,5-dichloro-4-hydroxyphenyl)-propane;
2,2-bis-(3,5-dibromo-4-hydroxyphenyl)-propane and 1,1-bis-(4-hydroxyphenyl)-cyclohexane.

Those aromatic polycarbonates which are based on one or more of the above mentioned preferred diphenols are preferred. It is particularly preferred to use copolycarbonates based on 2,2-bis-(4-hydroxyphenyl)-propane and one of the other particularly preferred diphenols. Polycarbonates alone based on 2,2-bis-(4-hydroxyphenyl)-propane or on 2,2-bis-(3,5-dimethyl-4-hydroxyphenyl)-propane are also particularly preferred.

The aromatic polycarbonates may be prepared by known methods, e.g. by solvent-free transesterification of bisphenol and diphenylcarbonate or from bisphenols and phosgene in solution. The solution may be homogeneous ("pyridine process") or heterogeneous ("diphasic interface process"). Polycarbonates which are prepared in solution, in particular by the diphasic interface process, are particularly preferred according to the invention.

The aromatic polycarbonates may be branched by the incorporation of small quantities, preferably from 0.05 to 2.0 mol-%, based on the quantity of diphenols, of trifunctional or higher functional compounds, e.g. compounds containing three or more than three phenolic hydroxyl groups.

Polycarbonates of this kind are described, for example, in DE-OS Nos. 1 570 533; 1 595 762; 2 116 974; 2 113 347 and 2 500 092, GB-PS No. 1 079 821, and U.S. Pat. No. 3,544,514.

The following are examples of some suitable compounds containing three or more than three phenolic hydroxyl groups: Phloroglucinol; 4,6-dimethyl-2,4,6-tri-(4-hydroxyphenyl)-hept-2-ene; 4,6-dimethyl-2,4,6-tri-(4-hydroxyphenyl)heptane; 1,3,5-tri-(4-hydroxyphenyl)-benzene; 1,1,1-tri(4-hydroxyphenyl)-ethane; tri-(4-hydroxyphenyl)-cyclohexylpropane; 2,4-bis-(4-hydroxyphenyl-isopropyl)-phenol; 2,6-bis-(2'-hydroxy-5'-methyl-benzyl)-4-methylphenol; 2-(4-hydroxyphenyl)-2-(2,4-dihydroxyphenyl)-propane and 1,4-bis-(4,4''-dihydroxy-triphenyl-methyl)-benzene. Other trifunctional compounds include 2,4-dihydroxy-benzoic acid, trimesic acid, cyanuric chloride and 3,3-bis-(4-hydroxyphenyl)-2-oxo-2,3-dihydro-indole.

The aromatic polycarbonates should generally have an average molecular weight $\overline{M}_w$ (weight average) of from 10,000 to over 200,000, preferably from 20,000 to 80,000 (determined by measurements of the relative viscosity in $CH_2Cl_2$ at 25° C. at a concentration of 0.5% by weight).

In the case of polycarbonate mixtures, small proportions of low molecular weight polycarbonates, e.g. with an average degree of polymerisation of 2 to 20, may be admixed with the high molecular weight polycarbonates having molecular weights $\overline{M}_w$ of from 10,000 to 200,000.

The graft polymers (C) are composed of 80 to 20 parts by weight of a rubber and 20 to 80 parts by weight of, predominantly, methylmethacrylate which has been polymerised in the presence of the rubber.

These graft polymers are known and may be prepared by graft polymerising the methylmethacrylate in the presence of a rubber by known polymerisation processes, e.g. solvent free, in solution or in emulsion, dispersion or suspension or by a combined process, such as solution-suspension polymerisation. In the course of polymerisation of the methylmethacrylate, ungrafted polymethylmethacrylate is formed in addition to the graft polymers of vinyl monomer on the rubber component. The proportion of this ungrafted constituent may be varied within a wide range by adjusting the graft polymerisation process and the polymerisation conditions. The degree of grafting is generally used as a measure of the quantity of graft polymerised methylmethacrylate. Graft polymers (C) for the purpose of this invention are polymers which are formed by the polymerisation of the vinyl monomer in the presence of the rubber, regardless of the degree of grafting.

The rubbers used for the graft polymerisation may be uncross-linked, partly cross-linked or highly cross-linked. If graft polymerisation is carried out in solution, for example, then uncross-linked rubbers are used, but if emulsion grafting is carried out then virtually any rubbers, whether cross-linked or not, may be used, provided they are in the form of an emulsion. The graft polymers (C) themselves invariably contain at least partially cross-linked rubbers, the rubbers preferably having a degree of cross-linking of at least 50% by weight. This means that even when uncross-linked rubbers are used as starting material for the preparation of the graft polymers (C), at least partial after-cross-linking of the rubber component occurs during the actual graft polymerisation of methyl methacrylate on the rubber.

Graft polymers (C) which are suitable for the invention therefore also include polymers which are at least partly cross-linked. The graft polymers normally have a gel content (i.e. proportion of insoluble constituents as a measure of the degree of cross-linking) of at least 15% by weight, preferably at least 50% by weight, in particular at least 60% by weight, determined at 23° C. in organic solvents.

The graft polymerisation of methylmethacrylate, optionally in admixture with small quantities of comonomer, is preferably initiated by radical or thermal initiation.

Natural and synthetic rubbers in a soluble or uncross-linked form are used as graft bases (C 1). Examples of suitable synthetic rubbers include homopolymers and copolymers of optionally halogen substituted, conjugated dienes having 4 to 8 carbon atoms, such as butadiene, isoprene, chloroprene and their copolymers with styrene and/or acrylonitrile. The copolymers may be randomly structured or in block form. Block type products may be two-block polymers of the form AB or three-block polymers of the form ABA or stellate block polymers, say of the form $(ABA)_xY$, where A may be, for example, styrene, B butadiene and Y a polyfunctional coupling reagent such as $SiCl_4$, $S_2Cl_2$, divinylbenzene, epoxidized fatty acids, etc. and x is of the order of 2 to 5. When soluble rubber is used, it is preferred to use polybutadienes having a high proportion of cis double bonds in the polymer chain, amounting to more than 55%, while the proportion of 1,2-vinyl double bonds may be up to 15%, based on all the double bonds; linear and stellate styrene-butadiene block polymers having a styrene content of 5 to 45% by weight are also advantageously used.

Another class of synthetic rubbers consists of ethylenepropylene copolymers and terpolymers. They contain 70 to 30 parts by weight of ethylene with 30 to 70 parts by weight of propylene. Terpolymers containing from 4 to 15% by weight of, for example, 5-ethylidene-norbornene, dicyclopentadiene, hexa-1,4-diene or 2,2,1-bicycloheptadiene with about 1 to 20 C=C double bonds per thousand atoms are advantageously used. Graft components based on these so-called EPDM and APTK rubbers are distinguished by their exceptionally high weather resistance. The class of polyethylene-co-vinyl acetates (EVA) and acrylate elastomers are also weather-resistant graft components. The EVA elastomers contain from 30 to 85% by weight of vinyl acetate incorporated by polymerisation and may be laterally esterified to enable them to be more easily grafted with unsaturated carboxylic acids such as acrylic or methacrylic acid. The EVA copolymers may also be partly saponified, with OH numbers ranging from 1 to about 100 mg of KOH per g of substance. Acrylate rubbers are in most cases copolymers of $C_2$-$C_8$ alkyl esters of acrylic acid, e.g. ethyl, n- or iso-propyl, n-butyl, isobutyl, tert.-butyl or 2-ethylhexyl acrylate. Further examples of comonomers include inter alia methacrylates having 1 to 14 carbon atoms in the ester moiety, butadiene, and vinyl alkyl ethers having 1 to 18 carbon atoms in the ether moiety. These acrylate rubbers may contain small quantities of polyfunctional vinyl monomers or alkyl monomers for cross-linking the acrylate rubber. Examples of such functional monomers include alkyl glycol di(meth)acrylates, (meth)acrylic acid vinyl esters, triallyl cyanurate, butadiene, isoprene, divinylbenzene, etc.

Graft component (C) may also be built up of several shells, e.g. with a polybutadiene, polystyrene, polymethylmethacrylate or SAN polymer core enveloped in a polyacrylic acid ester. Particularly preferred are the graft substrates based on polybutadiene and polyacrylic acid esters, such as those described in some detail in DE-OS Nos. 3 039 114, 3 039 115, 3 117 052 and 3 210 284, EP No. 0 063 263 and EP No. 0 064 692.

Components (A), (B) and (C) are preferred separately and mixed by solvent-free compounding on rollers, kneaders, internal mixers or screw mixers by the techniques conventionally used for polymer blends. Conventional additives such as lubricants, stabilizers, flame-retarding agents, pigments, reinforcing fillers, mineral fillers, matting agents, etc. may be used. The polymer blend moulding compounds may be used for the production of all kinds of moulded products. They are distinguished in particular by their good flow characteristics for injection moulding or extrusion and by their high dimensional stability under heat, mechanical strength and strength of their coalescence seams. They are also distinguished by the fact that moulded bodies produced from them do not flake or delaminate when subjected to mechanical stress. The polymer blends claimed according to the invention are very light in colour in the raw state and can be processed without discolouration at elevated temperatures of 240° C. to over 300° C. in short operating cycles with high utilization of the machines.

In the following Examples, parts are parts by weight and percentages are percentages by weight unless otherwise indicated.

Preparation of the copolymer resins (A)

750 parts of a mixture having a composition as indicated in Table 1 are introduced into a incased vessel equipped with internal thermometer, stirrer and inlet and outlet, and the mixture is heated to 130° C. A stream of monomers having the same composition is then added and an equal quantity of polymer solution is at the same time removed from the vessel to keep the level in the vessel constant. About 0.05 parts of tert.-butyl perpivalate (75% in dibutylphthalate) per hour is continuously added to the monomer stream. The conversion rate settles to a constant value of about 40% in about 2 hours. 0.1% by weight of 2,6-di-tert.-butyl-p-cresol is added to the polymer solution, which is then freed from monomers and volatile constituents in an evaporation extruder.

TABLE 1

| | Composition of the starting monomers and of copolymers A | | | | | | | | | |
|---|---|---|---|---|---|---|---|---|---|---|
| | Starting monomers (% by weight) | | | | | Copolymer (% by weight) | | | | |
| | Sty | NPMI | MMA | MA | ACN | Sty | NPMI | MMA | MA | ACN |
| A1 | 57.0 | 6.0 | 37.0 | — | — | 56.2 | 14.3 | 29.5 | — | — |
| A2 | 59.5 | 3.2 | 36.0 | 1.3 | — | 59.8 | 7.0 | 30.2 | 3.0 | — |
| A3 | 95.5 | 4.5 | — | — | — | 89.3 | 10.7 | — | — | — |
| A4 | 59.0 | 4.0 | 35.0 | 2.0 | — | 59.8 | 9.7 | 25.7 | 4.8 | — |
| Comparison Examples | | | | | | | | | | |
| V1 | 73.0 | — | — | 5.0 | 22.0 | 71.0 | — | — | 12.0 | 17.0 |
| V2 | 70.5 | — | — | 3.5 | 26.0 | 68.8 | — | — | 8.1 | 23.1 |

Sty = styrene
MA = maleic acid anhydride
MMA = methylmethacrylate
NPMI = N—phenyl-maleimide
ACN = acrylonitrile Polycarbonate resin B The polycarbonate based on 4,4-dihydroxy-2,2-diphenylpropene-(BPA polycarbonate) had a relative viscosity of 1.28 determined in a solution of 0.5 g of polycarbonate in 100 ml of methylene chloride at 25° C.

Graft copolymers (C)

$C_1$—Graft rubber prepared by grafting 20 parts of methylmethacrylate on 80 parts of an emulsion polymerised polybutadiene, the average particle diameter of the graft base being about 0.4 μm.

$C_2$—Graft rubber prepared by grafting 30 parts of methylmethacrylate on 70 parts of an emulsion polymerised, cross-linked butyl acrylate rubber, the average particle diameter of the graft base being 0.5 μm.

$C_3$—Graft rubber prepared by grafting 50 parts of styrene and acrylonitrile in a ratio of 72:28 on 50 parts of an emulsion polymerised polybutadiene, the average particle diameter of the graft base being about 0.4 μm.

Preparation of the mixtures

The components were mixed as indicated in Table 2 and compounded in a conical double-shaft extruder at 230° C. The sample bodies were obtained by injection moulding at 250° C.

The moulding compounds according to the invention obtained according to Examples 1 to 5 do not delaminate under mechanical stress. When the standard test rods are broken, the break is found to be accompanied by a constriction of the sample. Samples obtained from the comparison examples show distinct delamination and scaling after breakage.

The thermostability is tested by a high temperature spraying test in which the melt is kept at 280° C. for 10 minutes before being sprayed. The moulded compounds of Comparison Examples 6 to 8 are found to be considerably more severely discoloured than the moulding compounds according to the invention of Examples 1 to 5.

To assess the tendency of the moulded compounds to undergo cross-linking, the compounds are heated to 280° C. and kept at this temperature. The fluidity is then measured by the MFI method after 5, 10, 15 and 20 minutes.

The moulding compounds according to the invention of Examples 1 to 5 show no rise in melt viscosity whereas the moulding compounds of Comparison Examples 6 to 8 show an increase in melt viscosity as indicated in Table 2, which gives the half life $t_{\frac{1}{2}}$ during which the fluidity of the melt falls to half the initial value.

TABLE 2

| | $a_k^{20°C.}$ KJ/m² | $a_k^{-40°C.}$ KJ/m² | Vicat B °C. | MFI$_{260°C.}$ g/10 min | Discolouration 260° C./10 | $t_{\frac{1}{2}}$ 260° C. |
|---|---|---|---|---|---|---|
| Composition | | | | | | |
| 1  35 Parts A1 45 Parts B 20 Parts C1 | 52 | 25 | 127 | 7.2 | slight | — |
| 2  25 Parts A1 45 Parts B 20 Parts C2 | 42 | 23 | 125 | 7.8 | — | — |
| 3  30 Parts A2 45 Parts B 20 Parts C1 | 53 | 27 | 124 | 8.0 | slight | — |
| 4  35 Parts A3 45 Parts B 20 Parts C1 | 45 | 22 | 123 | 8.5 | slight | — |
| 5  35 Parts A4 45 Parts B 20 Parts C1 | 49 | 24 | 126 | 7.1 | | |
| Comparison Experiments | | | | | | |
| 6  30 Parts V1 45 Parts B 20 Parts C3 | 35 | 18 | 121 | 4.9 | severe | 20 min. |
| 7  35 Parts V2 45 Parts B 20 Parts C3 | 30 | 15 | 122 | 5.1 | severe | 24 min. |
| 8  35 Parts V1 45 Parts B 20 parts C1 | 30 | 17 | 123 | 4.7 | marked | 27 min. | a Index k Notched impact strength according to DIN 53 453
Vic. B Dimensional stability under heat according to Vicat B in °C. according to DIN 53 460
MFI Melt Flow Index according to DIN 53 735 at 260° C.

We claim:

1. Thermoplastic blend of moulding composition compounds comprising
   (A) 20–78 parts by weight (based on the moulding compounds) of a randomly structured copolymer of
      (a₁) 12 to 92 parts by weight (based on the copolymer) of styrene, p-methylstyrene or mixtures thereof,
      (a₂) 8 to 30 parts by weight (based on the copolymer) of a mixture of 100 to 10% by weight of N-phenyl- or N-methylmaleimide and 0 to 90% by weight of maleic acid anhydride,
      (a₃) 0 to 80 parts by weight (based on the copolymer) of methylmethacrylate,
   (B) 12–60 parts by weight (based on the moulding compounds) of a thermoplastic dihydroxy dialkane polycarbonate and
   (C) 10–40 parts by weight (based on the moulding compounds) of a graft polymer of 20 to 80 parts by weight of methylmethacrylate on 80 to 20 parts by weight of a rubber having a glass transition temperature below −20° C.

* * * * *